United States Patent
Takahashi (10) Patent No.: US 11,983,979 B2
(45) Date of Patent: May 14, 2024

(54) ITEM CONVEYANCE MECHANISM OF ITEM VENDING MACHINE

(71) Applicant: SANDEN RETAIL SYSTEMS CORPORATION, Isesaki (JP)

(72) Inventor: Dai Takahashi, Isesaki (JP)

(73) Assignee: SANDEN RETAIL SYSTEMS CORPORATION, Gunma (JP)

(*) Notice: Subject to any disclaimer, the term of this patent is extended or adjusted under 35 U.S.C. 154(b) by 410 days.

(21) Appl. No.: 17/292,990

(22) PCT Filed: Nov. 11, 2019

(86) PCT No.: PCT/JP2019/044085
§ 371 (c)(1),
(2) Date: May 11, 2021

(87) PCT Pub. No.: WO2020/100799
PCT Pub. Date: May 22, 2020

(65) Prior Publication Data
US 2022/0005307 A1  Jan. 6, 2022

(30) Foreign Application Priority Data
Nov. 13, 2018  (JP) .................. 2018-213259

(51) Int. Cl.
*G07F 11/58* (2006.01)
*G07F 11/16* (2006.01)

(52) U.S. Cl.
CPC .......... *G07F 11/58* (2013.01); *G07F 11/1653* (2020.05)

(58) Field of Classification Search
CPC ....................................................... G07F 11/58
(Continued)

(56) References Cited

U.S. PATENT DOCUMENTS

| 4,436,194 A | 3/1984 | Hanley |
| 5,341,954 A * | 8/1994 | Smith ............... G07F 11/42 221/85 |

(Continued)

FOREIGN PATENT DOCUMENTS

| CA | 1039245 | 9/1978 |
| CN | 103871171 | 6/2014 |

(Continued)

OTHER PUBLICATIONS

Search Report dated Apr. 26, 2022 issued in Application No. 19885386.3.

*Primary Examiner* — Gene O Crawford
*Assistant Examiner* — Ayodeji T Ojofeitimi
(74) *Attorney, Agent, or Firm* — Cozen O'Connor (57) ABSTRACT

Provided is a dispensing mechanism for an article vending machine, which can facilitate coupling of a drive section to a dispensing unit. A dispensing mechanism 55 for an article vending machine includes a drive section 60 that is disposed in a rear part of an article storing shelf and configured to cause a motion based on a vending command, and a belt conveyor unit 57 that is disposed in front of the drive section 60 and carries articles arranged in a front-rear direction, the belt conveyor unit being driven by the drive section 60 to sequentially dispense the articles forward, a gear shaft 63 that is an output shaft of the drive section 60 is removably coupled to a first gear shaft that is an input shaft of the belt conveyor unit 57, and the belt conveyor unit 57 is configured to be replaceable relative to the drive section 60, the belt conveyor unit 57 includes a belt conveyor 71 that moves the articles forward, a spur gear 76b that transmits, to the belt conveyor 71, driving force transmitted to the input shaft, and a cover 77 that covers a gear such as the spur gear 76b, and (Continued)

a part of the spur gear 76b is exposed to outside the cover 77.

10 Claims, 7 Drawing Sheets

(58) Field of Classification Search
USPC .......................................................... 221/119
See application file for complete search history.

(56) References Cited

U.S. PATENT DOCUMENTS

| | | | |
|---|---|---|---|
| 6,499,627 B2 | 12/2002 | Arai | |
| 8,550,293 B2 * | 10/2013 | Garson | ................... G07F 11/32 |
| | | | 211/59.3 |
| 2011/0049067 A1 * | 3/2011 | Garson | ................... A47F 1/126 |
| | | | 211/59.3 |
| 2018/0108203 A1 | 4/2018 | Li et al. | |

FOREIGN PATENT DOCUMENTS

| | | |
|---|---|---|
| JP | 2000-9205 | 1/2000 |
| JP | 2013-246563 | 12/2013 |
| JP | 2013-246564 | 12/2013 |
| JP | 2016-154055 | 8/2016 |
| JP | 2018-5331 | 1/2018 |

\* cited by examiner

ITEM CONVEYANCE MECHANISM OF ITEM VENDING MACHINE

RELATED APPLICATIONS

This is a U.S. National Phase Application under 35 USC 371 of International Application PCT/JP2019/044085 filed on Nov. 11, 2019.

This application claims the priority of Japanese application no. 2018-213259 filed Nov. 13, 2018, the entire content of which is hereby incorporated by reference.

TECHNICAL FIELD

The present invention relates to a dispensing mechanism that dispenses articles stored in a shelf, in an article vending machine that automatically vends the articles.

BACKGROUND ART

There has been a known article vending machine that stores a plurality of types of articles on shelves provided in a box-shaped cabinet, and automatically dispenses an article selected by a purchaser. For example, an article vending machine (an automatic vending machine) described in Patent Document 1 includes a bucket (a catcher bucket) that moves in an up-down direction in front of a plurality of shelves arranged in the up-down direction in a cabinet, and a dispensing mechanism is used to push an article selected by a purchaser forward from a corresponding shelf to dispense the article into the bucket moved to front of the shelf. Then, in such a structure, the bucket carrying the article thereon is moved to a position opposed to an article outlet located in a lower part of the article vending machine, and the purchaser takes out the article from the article outlet.

In the article vending machine described in Patent Document 1, as a dispensing mechanism that dispenses the article carried on the shelf forward, a spiral dispensing mechanism including a spiral as a spiral rod-shaped part and a belt conveyor type dispensing mechanism are disclosed.

The belt conveyor type dispensing mechanism disclosed in Patent Document 1 is divided into a drive section including a motor fixed to an inner plate (a back plate) of the shelf, and a dispensing unit including a belt conveyor carried on the shelf. Therefore, the belt conveyor type dispensing mechanism is configured such that the dispensing unit is replaceable relative to the drive section.

PRIOR ART DOCUMENT

Patent Document

Patent Document 1: Chinese Patent Publication No. 103871171

SUMMARY OF THE INVENTION

Problems to be Solved by the Invention

A dispensing unit disclosed in Patent Document 1 includes an input shaft protruding rearward, and the input shaft is inserted into and coupled to an output shaft of a drive section, so that power of the drive section can be transmitted to the dispensing unit.

In a coupled portion between the drive section and the dispensing unit, however, a key groove or the like is provided to transmit driving force, and it is necessary to perform rotation alignment during coupling. This coupled portion is located in an inner part of the shelf, and therefore cannot be visually seen, and it is difficult to couple the dispensing unit to the drive section with ease.

An object of the present invention, which has been made in view of such problems as described above, is to provide a dispensing mechanism for an article vending machine, which can facilitate coupling of a drive section to a dispensing unit, in the dispensing mechanism for the article vending machine, provided in a shelf of the article vending machine, and including a configuration where the drive section and the dispensing unit are divided.

Means for Solving the Problems

In order to achieve the above object, an aspect of the present invention is directed to a dispensing mechanism for an article vending machine, including a drive section that is disposed in a rear part of an article storing shelf and configured to cause a motion based on a vending command, and a dispensing unit that is disposed in front of the drive section and carries articles arranged in a front-rear direction, the dispensing unit being driven by the drive section to sequentially dispense the articles forward, an output shaft of the drive section being removably coupled to an input shaft of the dispensing unit, the dispensing unit being configured to be replaceable relative to the drive section, wherein the dispensing unit includes a movement mechanism that moves the articles forward, a gear that transmits, to the movement mechanism, driving force transmitted to the input shaft, and a cover that covers the gear, and a part of the gear is exposed to outside the cover.

Preferably, the cover may include an opening through which the part of the gear is exposed.

Preferably, the gear may be disposed in a central portion of the dispensing unit in a right-left direction, and the opening may be provided in a central portion of the case in the right-left direction.

Preferably, the opening may be provided in a front surface of the cover.

Preferably, the output shaft and the input shaft may be arranged to extend in the front-rear direction, and the dispensing unit may be moved rearward relative to the shelf to bring the dispensing unit closer to the drive section such that the output shaft of the drive section is coupled to the input shaft of the dispensing unit.

Advantageous Effects of the Invention

According to the present invention, a part of a gear is exposed to outside a cover, and hence, an operator can rotate the gear, for example, with fingers or the like. Consequently, an input shaft of a dispensing unit can be rotated. Therefore, to couple an output shaft of a drive section to the input shaft of the dispensing unit, rotation alignment can be easily performed by rotating the gear.

MODE FOR CARRYING OUT THE INVENTION

Hereinafter, description will be made in detail as to an embodiment of the present invention with reference to the drawings.

Figure 1:
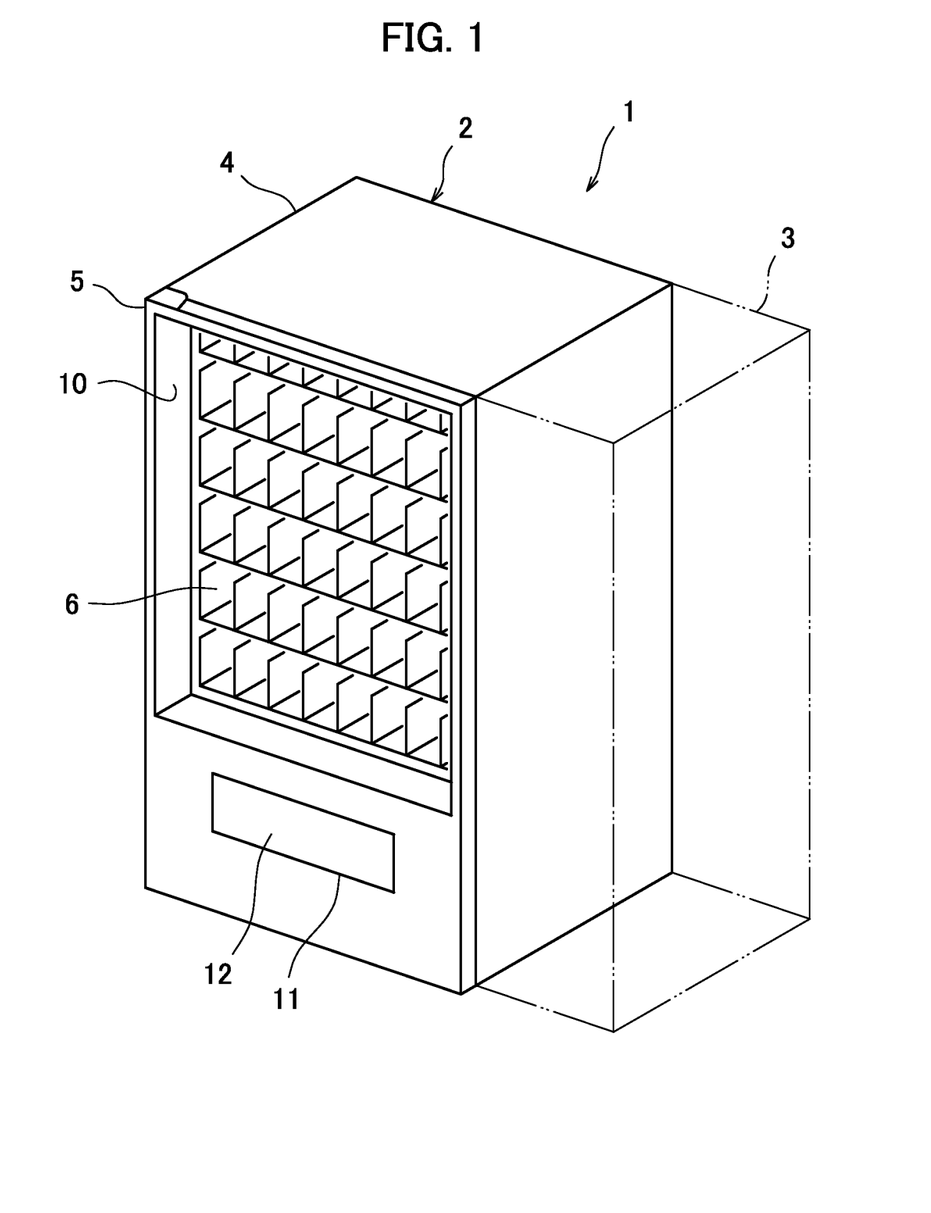
FIG. 1 is a perspective view showing a schematic exterior shape of an article vending machine of an embodiment of the present invention.
Figure 2:
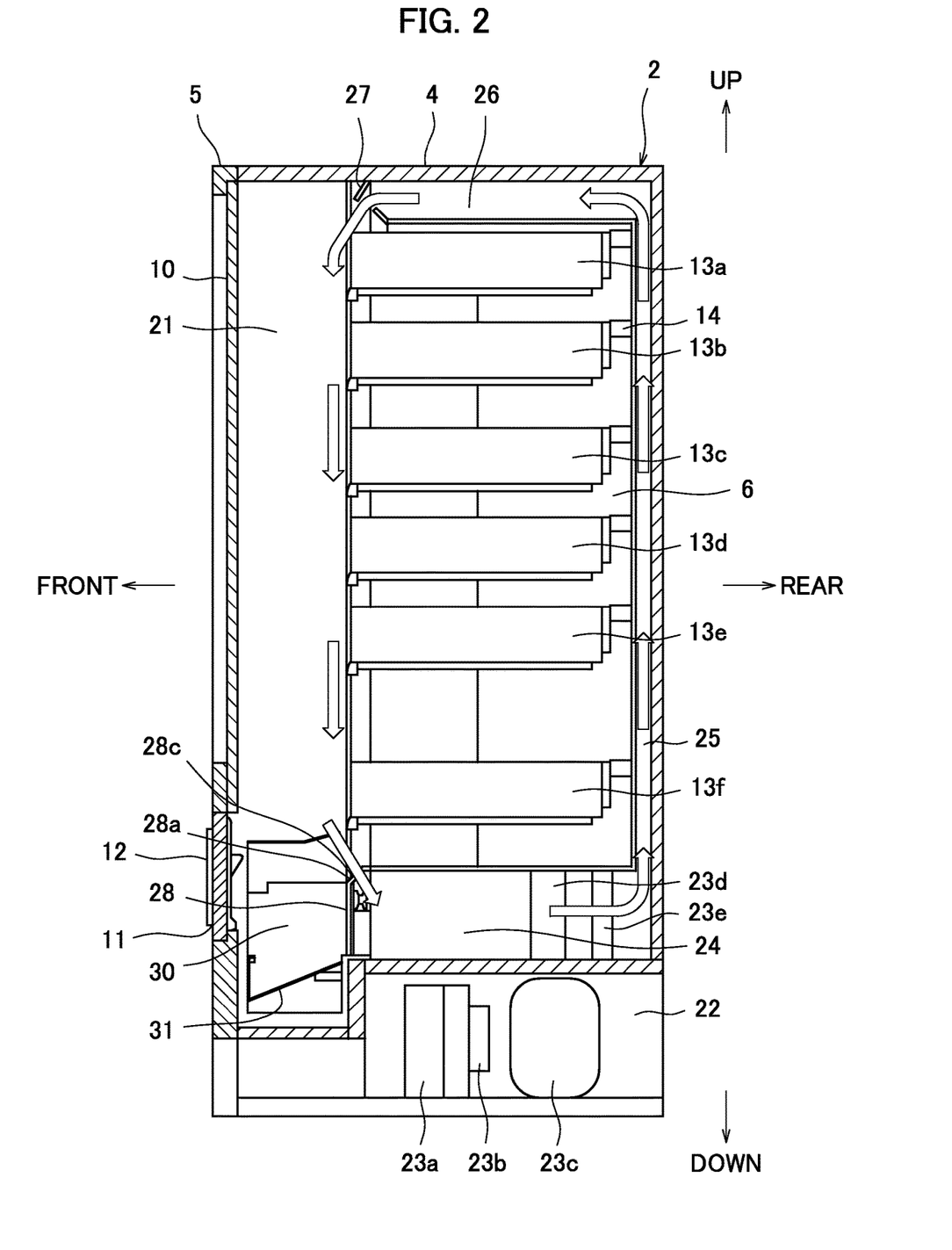
FIG. 2 is a vertical cross-sectional view showing an interior structure of the article vending machine of the present embodiment.

FIG. 1 is a perspective view showing a schematic exterior shape of an article vending machine of the present embodiment. FIG. 2 is a vertical cross-sectional view showing an interior structure of the article vending machine.

As shown in FIG. 1, an article vending machine 1 includes a main body unit 2 that stores articles, and an operation unit 3.

The main body unit 2 includes a box-shaped cabinet 4 formed in a box shape having an opened front surface, and including a door 5 that openably/closably covers a front surface opening. Furthermore, an article storage section 6 that stores the articles is provided inside the cabinet 4.

The operation unit 3 is disposed adjacent to a side of the main body unit 2, and includes a selecting switch of an article, and a billing section that performs acceptance or payment of charges by bills, coins or the like, or payment by card. The operation unit 3 transmits a vending command to the main body unit 2 in response to the payment of the charges performed in the billing section and a selecting operation of the article performed with the selecting switch.

As shown in FIGS. 1 and 2, an upper part of a front surface of the door 5 of the main body unit 2 is configured such that the interior can be viewed through a transparent plate 10 made of transparent glass or resin. In a lower part of the door 5, a rectangular article outlet 11 (an outlet) is provided. In the article outlet 11, a rectangular plate-like outlet shutter 12 is provided. The outlet shutter 12 is supported swingably in a front-rear direction in an upper edge portion of the article outlet 11. The outlet shutter 12 closes the article outlet 11 at a closing position extending in an up-down direction, and has a lower part swung rearward from this closing position, to open the article outlet 11.

The article storage section 6 in the cabinet 4 is configured such that a plurality of (e.g., six) shelves 13a to 13f each having an opened front part are arranged at a distance in the up-down direction. The shelf 13f of a bottom row in the article storage section 6 stores articles that are comparatively large in the up-down direction, such as PET bottle beverages, and the shelf 13a in a top row stores articles that are comparatively small in the up-down direction.

A space where a bucket 30 moves (hereinafter, referred to also as a bucket moving space 21) is provided in the front-rear direction between a front end portion of each of the shelves 13a to 13f and the transparent plate 10 that is the front surface of the door 5.

The bucket 30 is formed with about the same length as in each of the shelves 13a to 13f in a right-left direction, and configured to be movable in the bucket moving space 21 in the up-down direction. The bucket 30 is moved in the up-down direction by an unshown actuator provided inside the cabinet 4, and a rear end portion of a bottom plate 31 of the bucket 30 is movable to upper and lower positions of a bottom plate of each of the shelves 13a to 13f. The bucket is movable so that the rear end portion of the bottom plate is located below a lower surface of the shelf 13f of the bottom row when the bucket is moved to a bottom. Note that a position of the bucket 30 moved to the bottom is a standby/outlet position. At this standby/outlet position, the article outlet 11 is located at a front surface of the bucket 30, and one can open the outlet shutter 12 and put one's hand into the bucket 30.

Inside the main body unit 2, a machine room 22 is disposed below the article storage section 6. In the machine room 22, a condenser 23a of cooling equipment by refrigeration cycle, a fan 23b for the condenser and a compressor 23c are provided. A front part and a rear pat of the machine room 22 communicate with an exterior. Furthermore, a lower duct 24 is disposed between the machine room 22 and the shelf 13f of the bottom row. The lower duct 24 is provided with an evaporator 23d for the cooling equipment and a fan 23e for the evaporator 23d. The fan 23e generates flow of air passing through the evaporator 23d from front to rear of the lower duct 24.

A rear part of the lower duct 24 communicates with a rear duct 25 extending in the up-down direction behind the article storage section 6. Furthermore, an upper duct 26 extending in the front-rear direction is disposed above the article storage section 6.

A front opening of the upper duct 26 opens toward an upper part of the bucket moving space 21. Additionally, a wind guide plate 27 inclined downward and forward at an angle of, for example, 45 degrees is disposed in an upper edge portion of the front opening of the upper duct.

On the other hand, a back panel 28 is disposed in a front end portion of the lower duct 24. The back panel 28 extends in the up-down direction, and defines the bucket moving space 21 in front of the lower duct 24 together with the duct. Furthermore, in an inclined part 28a that is an upper part of the back panel 28, a plurality of vents 28c each having a diameter of about several millimeters are arranged at a distance of about 1 cm in up-down and right-left directions.

When each component of the cooling equipment is operated, particularly when the fan 23e in the lower duct 24 is operated, as shown by arrows in FIG. 2, cooling air passing through and cooled by the evaporator 23d circulates from the lower duct 24 through the rear duct 25, the upper duct 26, and the bucket moving space 21 to the lower duct 24 in order. Note that part of the cooling air from the rear duct 25 moves forward among the shelves 13a to 13f, to cool the articles C stored in the shelves 13a to 13f.

During the movement of the cooling air from the upper duct 26 to the bucket moving space 21, the cooling air is moved downward in a rear part of the bucket moving space 21 via the wind guide plate 27, and the cooling air moves through the vents 28c of the back panel 28 to the lower duct 24. Therefore, the cooling air forms air curtain along front surfaces of the shelves 13a to 13f. Consequently, the cooling air can be inhibited from being in contact with the transparent plate 10 of the door 5, and the transparent plate 10 of the door 5 can be inhibited from fogging up.

Figure 3:
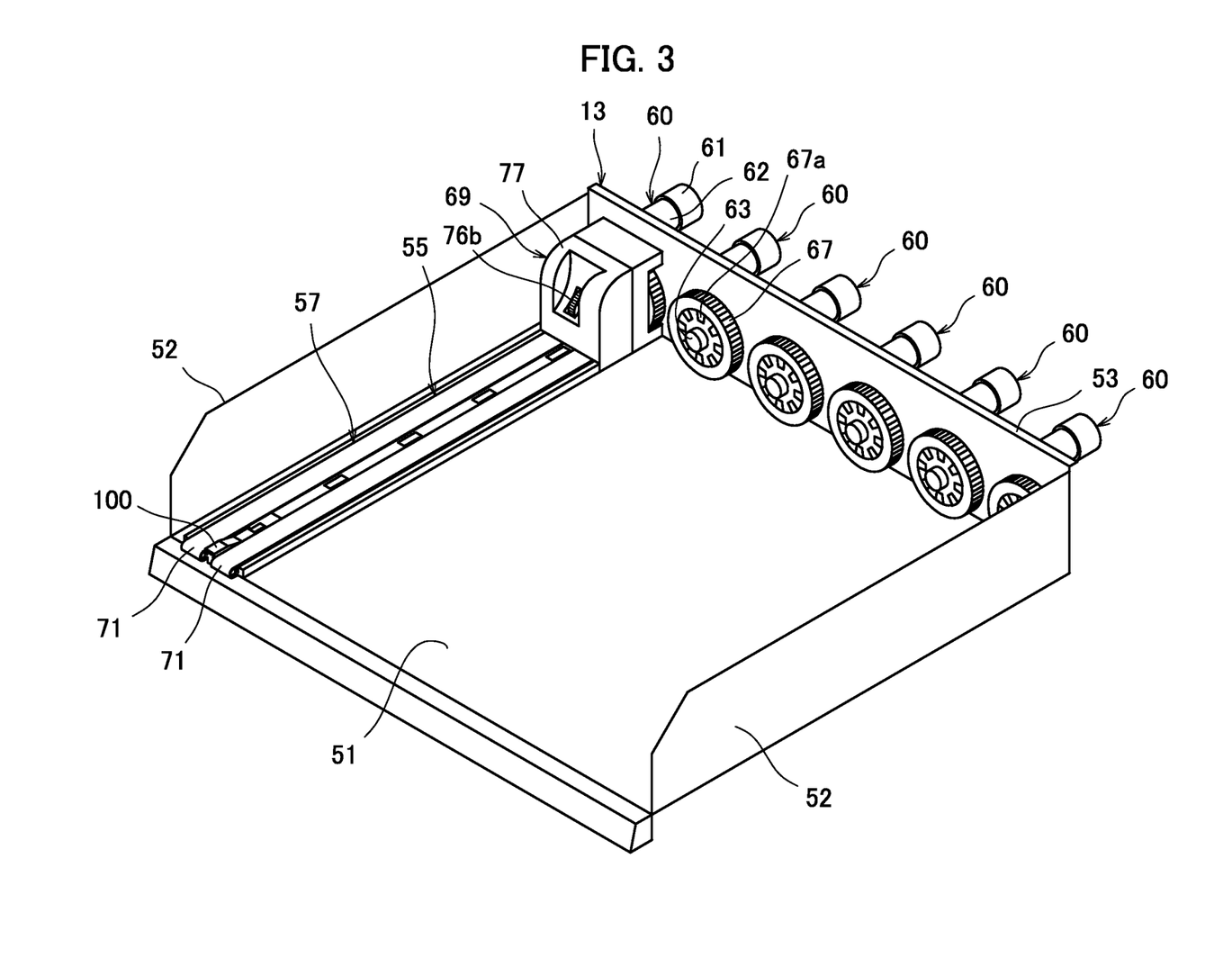
FIG. 3 is a perspective view showing a structure of a shelf of an article storage section.

FIG. 3 is a perspective view showing a structure of a shelf 13 of the article storage section 6.

As shown in FIG. 3, each of the shelves 13 (13a to 13f) is formed in a box shape including a bottom plate 51, right and left side plates 52 and a back plate 53, and opened upward and forward. Moreover, the shelf 13 includes the dispensing mechanism 55 and an unshown partition plate.

The dispensing mechanism 55 is constituted of a belt conveyor unit 57 (a dispensing unit) disposed on the bottom plate 51 of the shelf 13, and a drive section 60 fixed to the back plate 53 of the shelf 13. The belt conveyor unit 57 has about the same length as a length of the bottom plate 51 in a front-rear direction, and is disposed between the unshown partition plates or between the partition plate and the side plate 52.

A plurality of partition plates each extending in the front-rear direction are arranged at a distance from each other in a right-left direction between the right and left side plates 52 on the bottom plate 51. The partition plate is removably fixed to the bottom plate 51 and the back plate 53 of the shelf.

The drive section 60 includes a motor 61, a transmission section 62, and a gear shaft 63 (outout shaft).

The transmission section 62 contains a transmission gear, and is disposed on a rear surface side of the back plate 53 of the shelf 13. The motor 61 is fixed to a rear surface side of an upper part of the transmission section 62. A rear part of the gear shaft 63 extending in the front-rear direction is inserted into and rotatably supported by a lower part of the transmission section 62. The gear shaft 63 is formed by fixing a disk-shaped gear 67 to a front end portion of a columnar shaft. A front end portion of the gear shaft 63 protrudes forward from the back plate 53, and the gear 67 is disposed close to and on a front surface side of the back plate 53.

In a front surface of the gear 67, a connecting section 67a is disposed to which an input shaft of the belt conveyor unit 57 is removably connected. The belt conveyor unit 57 is carried at the same position as a position of an axis of the gear shaft 63 in the right-left direction on the bottom plate 51 of the shelf 13, has a front end portion removably fixed to a front end portion of the bottom plate 51, and has a rear end portion removably fixed to the back plate 53.

Figure 4:
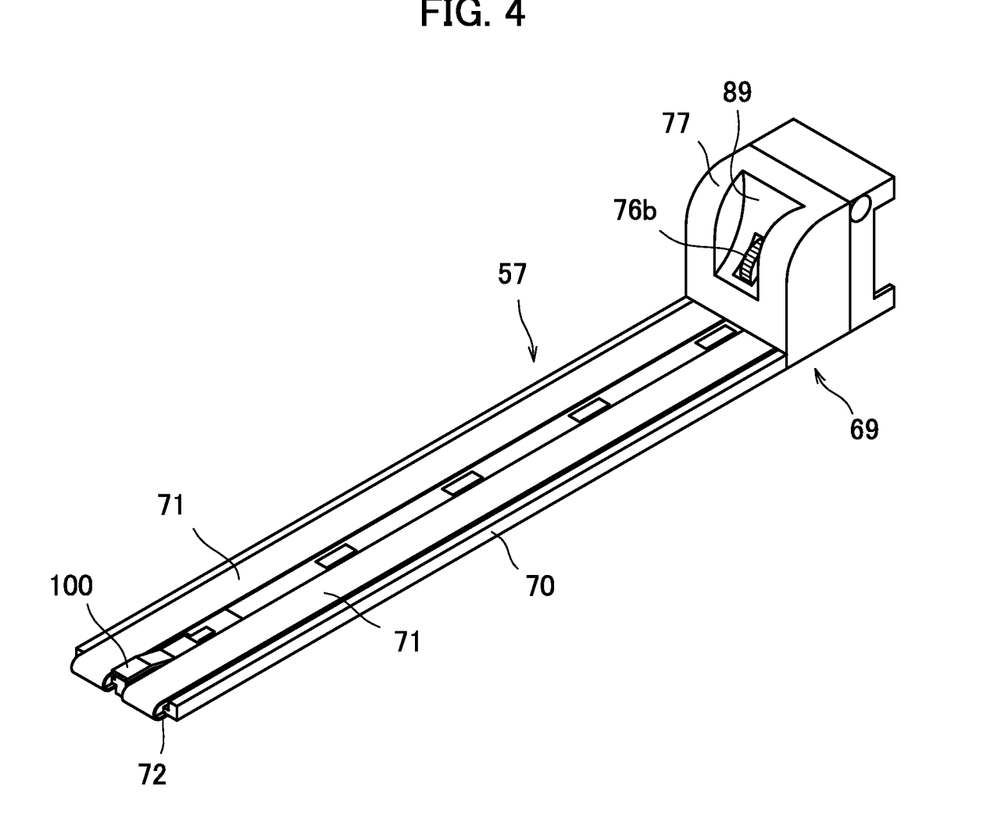
FIG. 4 is a perspective view showing a structure of a belt conveyor unit.
Figure 5:
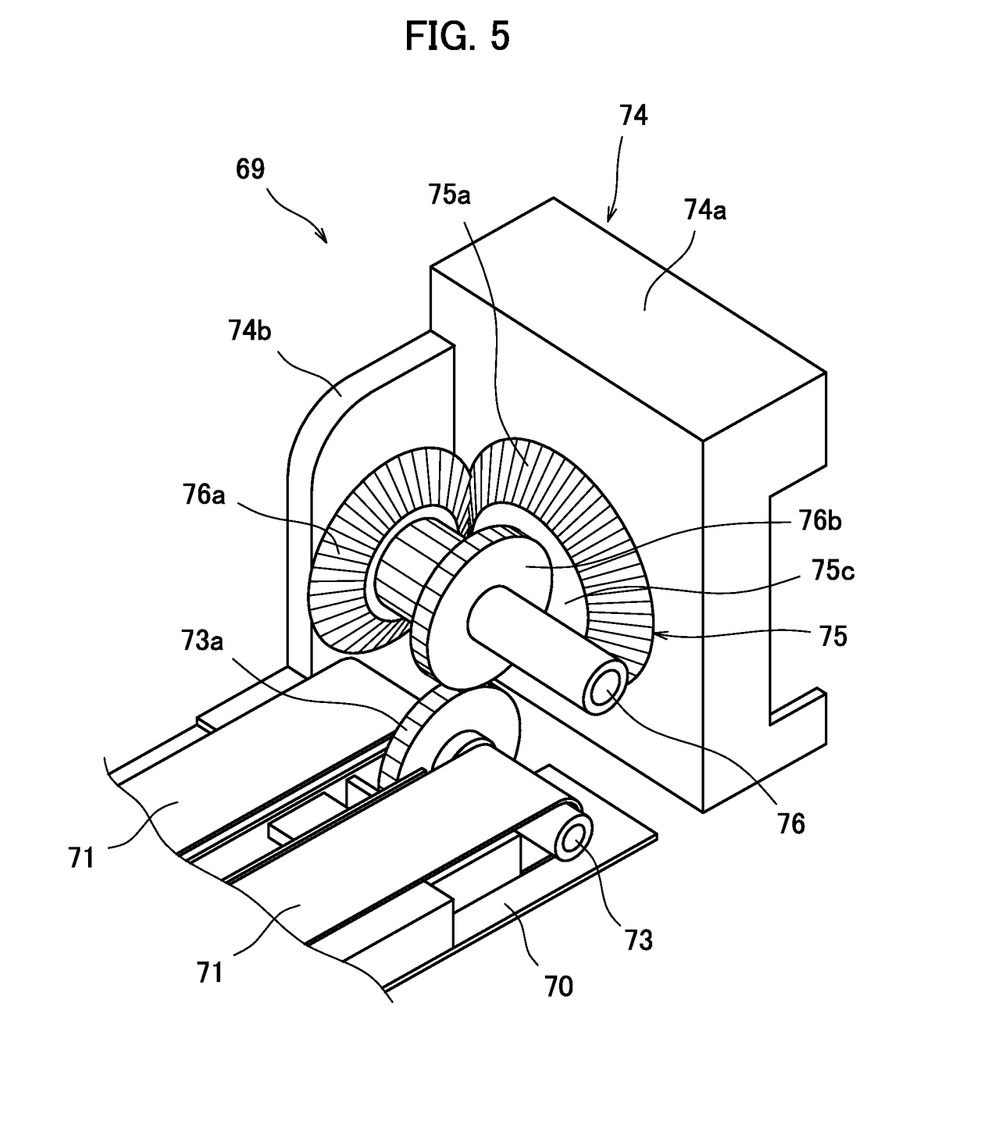
FIG. 5 is a front perspective view showing an interior structure of a gear section of the belt conveyor unit.
Figure 6:
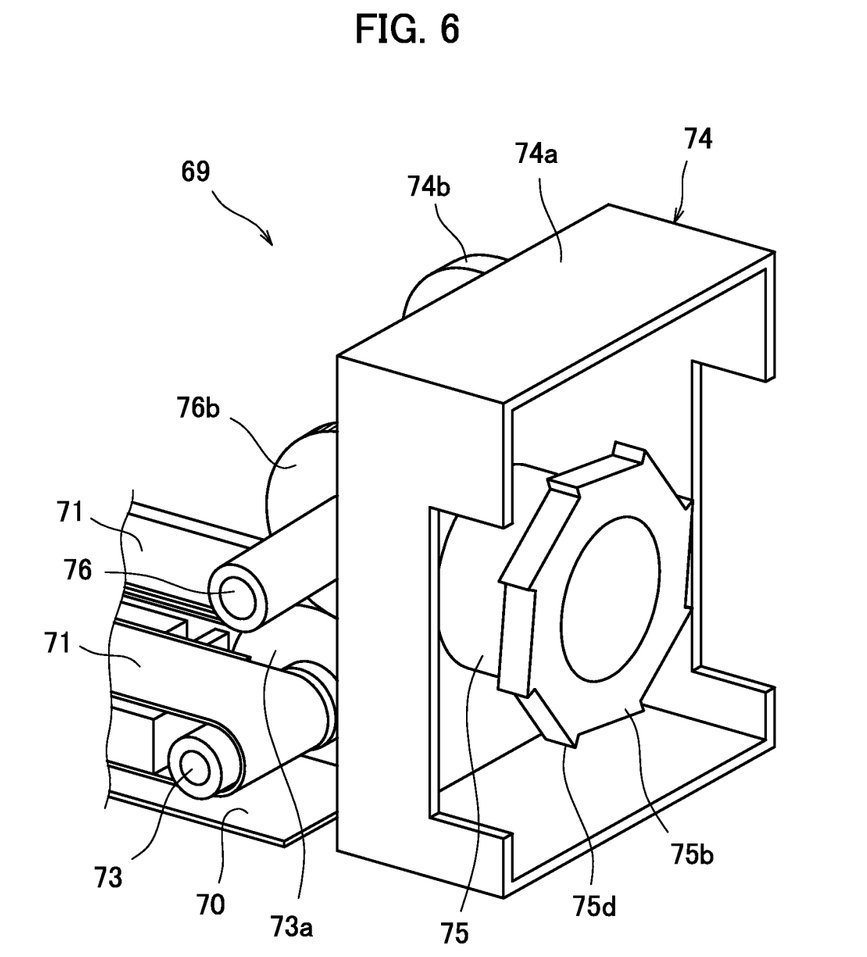
FIG. 6 is a rear perspective view showing the interior structure of the gear section of the belt conveyor unit.
Figure 7:
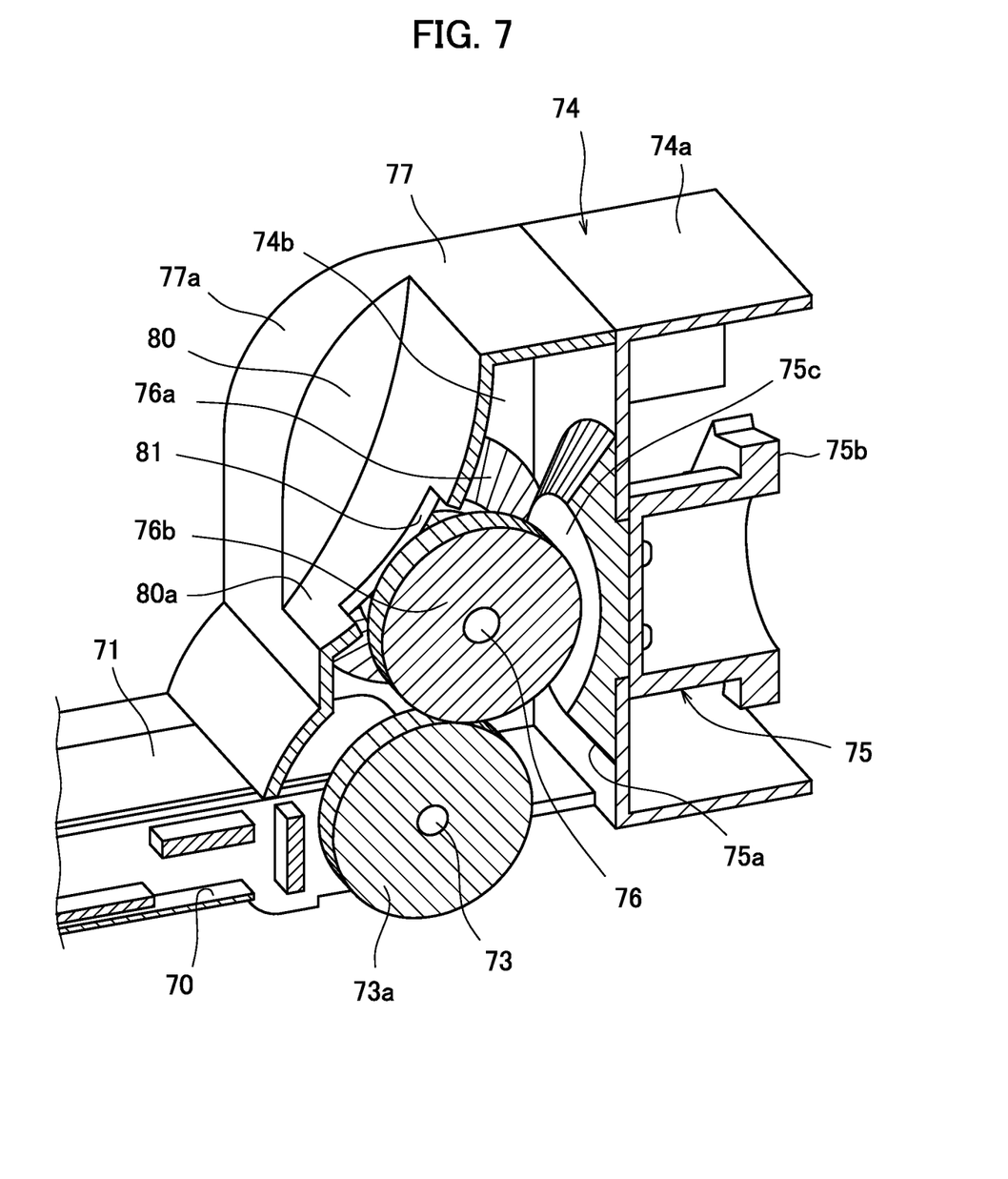
FIG. 7 is a vertical cross-sectional view showing the internal structure of the gear section of the belt conveyor unit.

FIG. 4 is a perspective view showing a structure of the belt conveyor unit 57. FIG. 5 is a front perspective view showing an interior structure of a gear section 69 of the belt conveyor unit 57. FIG. 6 is a rear perspective view showing the interior structure of the gear section 69 of the belt conveyor unit 57. FIG. 7 is a vertical cross-sectional view showing the internal structure of the gear section 69 of the belt conveyor unit 57. Note that in FIGS. 5, 6, a cover 77 and one of right and left vertical plates 74b are omitted.

As shown in FIGS. 4, 5, the belt conveyor unit 57 includes a support member 70 formed to extend in the front-rear direction of the shelf 13, a pair of belt conveyors 71 provided in parallel with each other in the support member 70, and the gear section 69 disposed in a rear end portion of the support member 70.

The support member 70 is a member having a length that is several centimeters shorter than a length of the bottom plate 51 in the front-rear direction, and having a length of, for example, several centimeters in the right-left direction.

In a front end portion of the support member 70, a front rotary shaft 72 extending in the right-left direction is rotatably supported. In the rear end portion of the support member 70, a rear rotary shaft 73 (a belt drive shaft) extending in the right-left direction is rotatably supported in parallel with the front rotary shaft 72 and at about the same position as a position of the front rotary shaft in the up-down direction.

The pair of belt conveyors 71 are endless belts looped over the front rotary shaft 72 and the rear rotary shaft 73 at a distance of a predetermined distance (e.g., about 10 mm) in the right-left direction in parallel with each other, and having the same width in the right-left direction.

As shown in FIGS. 5 to 7, the gear section 69 includes a gear support member 74 fixed to the rear end portion of the support member 70, a first gear shaft 75 (input shaft), a second gear shaft 76, and the cover 77.

The gear support member 74 includes a box member 74a formed in a rectangular box shape having a rear part opened, and a pair of vertical plates 74b extending in the up-down direction, arranged at a distance from each other in the right-left direction, and connecting right and left end portions of a front surface of the box member 74a and right and left rear end portions of the support member 70, respectively.

The first gear shaft 75 is rotatably supported in a hole provided in a central portion of a front wall of the box member 74a, and disposed to extend in the front-rear direction. A first bevel gear 75a is fixed to a front side of a front wall of the first gear shaft 75, and a connecting section 75b is disposed on a rear side of the front wall of the box member 74a. The connecting section 75b is inserted and connected from front into the connecting section 67a of the gear 67 of the drive section 60, to transmit rotation between the gear shaft 63 of the drive section 60 and the first gear shaft 75. The connecting section 75b is formed, for example, by providing a saw-shaped stepped portion 75d every 45 degrees along an outer peripheral surface of a rear end portion of the first gear shaft 75. The stepped portion 75d of the first gear shaft 75 engages with the connecting section 67a disposed on the front surface of the gear 67 of the drive section 60, so that rotation can be transmitted between the gear shaft 63 and the first gear shaft 75. Furthermore, the first bevel gear 75a has a front surface recessed rearward to form a recess 75c.

The second gear shaft 76 is rotatably supported in holes provided in the pair of vertical plates 74b, and formed to extend in the right-left direction. The second gear shaft 76 is disposed at about the same position as a position of the first gear shaft 75 in the up-down direction and at a distance in front of the first gear shaft, and the second gear shaft is disposed in parallel with the rear rotary shaft 73.

A second bevel gear 76a that meshes with the first bevel gear 75a of the first gear shaft 75 is fixed to a vicinity of an end portion of the second gear shaft 76 in the right-left direction. A spur gear 76b is fixed to a central portion of the second gear shaft 76 in the right-left direction.

Furthermore, a spur gear 73a (a gear) that meshes with the spur gear 76b of the second gear shaft 76 is fixed to a central portion of the rear rotary shaft 73 in the right-left direction between two belt conveyors 71.

Therefore, the belt conveyor unit 57 is installed on the bottom plate 51, and the connecting section 75b is connected to the gear 67 of the drive section 60, to drive the motor 61 of the drive section 60. Consequently, the rear rotary shaft 73 rotates via the first gear shaft 75 and the second gear shaft 76, and the belt conveyor 71 is driven to rotate. Thus, the articles carried on the belt conveyor 71 can be moved forward and dispensed forward.

The cover 77 is disposed to cover a space between the right and left vertical plates 74b, and to cover the first gear shaft 75 (input shaft), the second gear shaft 76 and the spur gear 73a of the rear rotary shaft 73, and the cover is fastened to the rear end portion of the support member 70 with screws or the like.

A front wall surface 77a of the cover 77 has a lower part linearly extending in the up-down direction, and an upper part circularly bent rearward. Further, in a central portion of the front wall surface 77a of the cover 77 in the right-left direction, a recess 80 including a bottom portion 80a circularly bent downward and rearward is disposed. In the bottom portion 80a of the recess 80, an opening 81 is provided through which an upper part of the spur gear 76b protrudes upward by several millimeters. Also, a width of the recess 80 in the right-left direction gradually decreases from top to bottom, and is set to a width slightly larger than a width of a typical adult finger at the bottom. This makes it easier to insert the finger from an upper front part of the cover 77 into the recess 80.

That is, the belt conveyor unit 57 includes a structure where the upper part of the spur gear 76b is slightly exposed from the bottom portion 80a of the recess 80 in the cover 77. Then, one can put one's finger from front into the recess 80 to the belt conveyor unit 57, so that the upper part of the spur gear 76b is easily touched.

As described above, in the present embodiment, the dispensing mechanism 55 disposed in the shelf 13 of the article vending machine 1 is constituted of the drive section 60 fixed to the back plate 53 of the shelf 13, and the belt conveyor unit 57, and the gear shaft 63 that is an output shaft of the drive section 60 is removably attachable to the first gear shaft 75 that is the input shaft of the belt conveyor unit 57. Therefore, the belt conveyor unit 57 is configured to be replaceable relative to the drive section 60.

The gear shaft 63 and the first gear shaft 75 extend in the front-rear direction, and the belt conveyor unit 57 is inserted from front toward rear into the shelf 13, to connect the connecting section 67a of the gear shaft 63 to the connecting section 75b of the first gear shaft 75.

The connecting section 75b of the first gear shaft 75 is disposed in the rear end portion of the belt conveyor unit 57, and on a front side of the connecting section 75b, the box member 74a and the gear section 69 covered with the cover 77 are provided. Therefore, it is difficult to visually see the connecting section 75b and the connecting section 67a during connection. Consequently, it might be difficult to perform rotation alignment of the connecting section 75b and the connecting section 67a.

On the other hand, in the present embodiment, in the front wall surface 77a of the cover 77, the opening 81 is provided through which the spur gear 76b is exposed. Therefore, when the belt conveyor unit 57 is inserted from front toward rear into the shelf 13 to connect the connecting section 75b of the first gear shaft 75 to the connecting section 67a of the gear shaft 63, the spur gear 76b can be rotated with operator's finger from front of the cover 77.

Consequently, the rotation alignment of the connecting section 67a of the gear shaft 63 and the connecting section of the first gear shaft 75 can be performed by rotating the first gear shaft 75, and the gear shaft 63 can be easily connected to the first gear shaft 75.

In particular, the opening 81 is provided in the front wall surface 77a of the cover 77. Therefore, even when the other belt conveyor units 57 are present on opposite sides of the belt conveyor unit 57 in the right-left direction, the alignment can be performed by rotating the spur gear 76b without being obstructed.

Note that the spur gear 76b is formed with a comparatively large diameter so that the rear rotary shaft 73 decelerates relative to the second gear shaft 76. Therefore, although the bevel gears 75a, 76a are interposed between the first gear shaft 75 and the second gear shaft 76, the first gear shaft 75 can be rotated by rotating the spur gear 76b with a comparatively small force.

Also, the recess 80 is provided around the opening 81, and hence, one can put one's finger from front into the recess 80. Consequently, the spur gear 76b can be easily touched even when the spur gear 76b cannot be visually seen.

Note that the present invention is not limited to the above embodiment. For example, in place of the recess 80 and opening 81 of the cover 77, a cutout may be provided in a left end portion of the cover 77, to expose a part of the bevel gear 76a. Even in this configuration, the bevel gear 76a can be rotated. Therefore, the rotation alignment of the first gear shaft 75 and the gear shaft 63 can be performed by rotating the first gear shaft 75.

Furthermore, a detailed structure of, for example, the belt conveyor unit 57 in the above embodiment may be suitably changed. Additionally, the dispensing unit driven by the drive section 60 to sequentially dispense the articles forward may include a configuration other than the belt conveyor unit 57.

The present invention can be broadly adopted in the dispensing mechanism for the article vending machine in which the output shaft of the drive section is removably coupled to the input shaft of the dispensing unit, and the dispensing unit is configured to be replaceable relative to the drive section.

EXPLANATION OF REFERENCE SIGNS 1 article vending machine
13 shelf
55 dispensing mechanism
57 belt conveyor unit (a dispensing unit)
60 drive section
63 gear shaft (an output shaft)
71 belt conveyor (a movement mechanism)
73a spur gear (a gear)
75 first gear shaft (an input shaft)
77 cover
81 opening

The invention claimed is:

1. A dispensing mechanism for an article vending machine, comprising a drive section that is disposed in a rear part of an article storing shelf and configured to cause a motion based on a vending command, and a dispensing unit that is disposed in front of the drive section and carries articles arranged in a front-rear direction, the dispensing unit being driven by the drive section to sequentially dispense the articles forward, an output shaft of the drive section being removably coupled to an input shaft of the dispensing unit, the dispensing unit being configured to be replaceable relative to the drive section, wherein the dispensing unit comprises:
a movement mechanism that moves the articles forward,
a gear that transmits, to the movement mechanism, driving force transmitted to the input shaft, and
a cover that covers the gear, wherein
the cover has a recess, and
at the bottom of the recess, a part of the meshing teeth of the gear is exposed to the outside the cover.

2. The dispensing mechanism for the article vending machine according to claim 1, wherein the cover comprises an opening through which the part of the gear is exposed.

3. The dispensing mechanism for the article vending machine according to claim 2, wherein the gear is disposed in a central portion of the dispensing unit in a right-left direction, and
the opening is provided in a central portion of the cover in the right-left direction.

4. The dispensing mechanism for the article vending machine according to claim 2, wherein the opening is provided in a front surface of the cover.

5. The dispensing mechanism for the article vending machine according to claim 3, wherein the opening is provided in a front surface of the cover.

6. The dispensing mechanism for the article vending machine according to claim 1, wherein the output shaft and the input shaft are arranged to extend in the front-rear direction, and the dispensing unit is moved rearward relative to the shelf to bring the dispensing unit closer to the drive section such that the output shaft of the drive section is coupled to the input shaft of the dispensing unit.

7. The dispensing mechanism for the article vending machine according to claim 2, wherein the output shaft and the input shaft are arranged to extend in the front-rear direction, and the dispensing unit is moved rearward relative to the shelf to bring the dispensing unit closer to the drive section such that the output shaft of the drive section is coupled to the input shaft of the dispensing unit.

8. The dispensing mechanism for the article vending machine according to claim 3, wherein the output shaft and the input shaft are arranged to extend in the front-rear direction, and the dispensing unit is moved rearward relative to the shelf to bring the dispensing unit closer to the drive section such that the output shaft of the drive section is coupled to the input shaft of the dispensing unit.

9. The dispensing mechanism for the article vending machine according to claim 4, wherein the output shaft and the input shaft are arranged to extend in the front-rear direction, and the dispensing unit is moved rearward relative to the shelf to bring the dispensing unit closer to the drive section such that the output shaft of the drive section is coupled to the input shaft of the dispensing unit.

10. The dispensing mechanism for the article vending machine according to claim 5, wherein the output shaft and the input shaft are arranged to extend in the front-rear direction, and the dispensing unit is moved rearward relative to the shelf to bring the dispensing unit closer to the drive section such that the output shaft of the drive section is coupled to the input shaft of the dispensing unit.

\* \* \* \* \*